US012589388B2

(12) United States Patent
Chang et al.

(10) Patent No.: US 12,589,388 B2
(45) Date of Patent: Mar. 31, 2026

(54) MULTI-CHANNEL PARALLEL PRETREATMENT DEVICE

(71) Applicant: Chengdu Illumaxbio Technology Co., LTD, Chengdu (CN)

(72) Inventors: Le Chang, Chengdu (CN); Xingpeng Zhang, Chengdu (CN); Rundan Wei, Chengdu (CN)

(73) Assignee: Chengdu Illumaxbio Technology Co., LTD, Chengdu (CN)

( * ) Notice: Subject to any disclaimer, the term of this patent is extended or adjusted under 35 U.S.C. 154(b) by 628 days.

(21) Appl. No.: 18/078,123

(22) Filed: Dec. 9, 2022

(65) Prior Publication Data

US 2023/0158487 A1 May 25, 2023

(30) Foreign Application Priority Data

Nov. 25, 2021 (CN) ......................... 202111409471.4

(51) Int. Cl.
*B01L 3/00* (2006.01)
*B01L 3/02* (2006.01)
*B03C 1/30* (2006.01)

(52) U.S. Cl.
CPC ........... *B01L 3/5023* (2013.01); *B01L 3/0206* (2013.01); *B03C 1/30* (2013.01); *B01L 2400/043* (2013.01); *B01L 2400/0478* (2013.01)

(58) Field of Classification Search
CPC ................. B01L 3/5023; B01L 3/0206; B01L 2400/043; B01L 2400/0478; B03C 1/30; G01N 35/1074; G01N 35/0098; G01N 1/34; G01N 1/405; G01N 21/76; G01N 33/53
USPC ......................................................... 422/408
See application file for complete search history.

(56) References Cited

FOREIGN PATENT DOCUMENTS

CN 110749742 A * 2/2020 ............. G01N 35/00

OTHER PUBLICATIONS

CN110749742A, English Machine Translation from Google Patents, Chengdu Yilexin Biotechnology Co Ltd, obtained on Jul. 7, 2025, originally published Feb. 4, 2020, pp. 1-12. (Year: 2020).*

* cited by examiner

*Primary Examiner* — Christine T Mui
(74) *Attorney, Agent, or Firm* — Bayramoglu Law Offices LLC

(57) ABSTRACT

A multi-channel parallel pretreatment device includes a magnetic separation and transfer device and a first drive device. The magnetic separation and transfer device includes a second mounting bracket provided therein with an injector chamber. A mounting plate is provided above the top of the injector chamber and is provided with multiple piston rods that are connected to the injector chamber in a movable and sealing manner. The second mounting bracket is further provided thereon with a second drive device. The injector chamber is provided with loading heads that have a hollow structure. The piston rods have free ends that are provided with magnetic rods. The second drive device can drive the magnetic rods on the piston rods to pass through the loading heads. The first drive device and the second drive device realize the reciprocation of the loading heads.

8 Claims, 2 Drawing Sheets

MULTI-CHANNEL PARALLEL PRETREATMENT DEVICE

CROSS REFERENCE TO THE RELATED APPLICATIONS

This application claims priority based on Chinese patent application No. 202111409471.4 filed on Nov. 25, 2021, the entire contents of which are hereby incorporated by reference.

TECHNICAL FIELD

The present disclosure relates to the technical field of immunodiagnosis and in particular to a multi-channel parallel pretreatment device.

BACKGROUND

The existing magnetic particle-based reaction testing system has become one of the most popular means of clinical testing and has been widely used in hospitals at all levels due to its easy automation, fast response speed, and high signal-to-noise ratio (SNR). In this system, the pretreatment system related to a magnetic particle reagent directly affects the stability and accuracy of the testing results.

Currently, the most widely used conventional magnetic particle-based chemiluminescence instruments are large-scale instruments. During magnetic separation, a permanent magnet is loaded on the outside of a cuvette to absorb magnetic beads. Afterward, a pipette is used to suck the waste liquid away from the magnetic beads, then a cleaning solution is injected, and the magnetic beads are re-suspended by a mixing mechanism. The process is repeated three times.

However, the existing cleaning mechanism is complex and bulky and requires a dedicated liquid passage system and mixing mechanism. Thus, it involves various components such as a peristaltic pump, plunger pump, solenoid valve, mixing motor, eccentric mechanism, lifting mechanism, cleaning solution disposal mechanism, and waste liquid disposal mechanism. As a result, the instrument has defects of a complex structure, high cost, a high failure rate, and high maintenance expenses. Currently, there is also a device that can actively adsorb magnetic particles with the cooperation of a magnetic rod and a magnetic rod sleeve and realize the cleaning and separation functions through a separate cleaning solution. However, the device cannot achieve pipetting and cannot solve the problem of sample transfer.

SUMMARY

Given the above problems in the prior art, the present disclosure provides a multi-channel parallel pretreatment device for magnetic particle-based reaction testing. The present disclosure greatly reduces the complexity of the magnetic separation and cleaning mechanism, improves the reliability of the magnetic separation mechanism, enables multi-channel simultaneous high-precision pipetting, and achieves low cost.

To achieve the above objective, the present disclosure adopts the following technical solution:

The multi-channel parallel pretreatment device includes a magnetic separation and transfer device configured to perform separation and transfer of a magnetic particle reagent and a first drive device configured to drive the magnetic separation and transfer device to move. The magnetic separation and transfer device includes a second mounting bracket, which is provided therein with an injector chamber. A mounting plate is provided above the top of the injector chamber and is provided with piston rods that are connected to the injector chamber in a movable and sealing manner. The second mounting bracket is further provided thereon with a second drive device, which is configured to drive the mounting plate to linearly reciprocate in a vertical direction.

The injector chamber is provided with loading heads, each of which is configured to load a tip head or a magnetic separation sleeve and has a hollow structure.

The free ends of the piston rods are fixedly connected to magnetic rods that are configured to adsorb magnetic beads in the magnetic particle reagent. The second drive device can drive the magnetic rods on the piston rods to pass through the loading heads.

Further, as a specific implementation of the first drive device, the first drive device includes a first mounting bracket, which is provided thereon with a first motor. An output end of the first motor is provided with a first drive screw. The first mounting bracket is further vertically provided with a first linear guide rail. The first linear guide rail is connected to a slider in a slidable manner. The slider is fixedly connected to the second mounting bracket, and the first drive screw is connected to the slider in a threaded manner.

Further, as a specific implementation of the second drive device, the second drive device includes a second motor provided on the second mounting bracket. An output end of the second motor is provided with a second drive screw, which is connected to the mounting plate in a threaded manner. The injector chamber is vertically and fixedly provided with a second linear guide rail that is connected to the mounting plate in a slidable manner.

Further, to implement multi-channel parallel separation and transfer of the magnetic particle reagent and improve the separation and transfer efficiency of the magnetic particle reagent, multiple piston rods are provided and are evenly spaced in a length direction of the mounting plate, and the free end of each of the piston rods is fixedly connected to one magnetic rod.

Multiple loading heads are provided and are evenly spaced in a length direction of the injector chamber, and the loading heads are fitted with the magnetic rods one by one.

Further, to form negative pressure in the channels of the injector chamber in which the piston rods are connected to facilitate the automatic adsorption of the reagent by the tip heads by controlling the expansion and contraction of the piston rods, the multiple piston rods are connected to the injector chamber in a movable and sealing manner through a sealing ring or a sealing washer.

Further, as a specific implementation of a fit between the loading head and the magnetic separation sleeves as well as the tip heads, the loading heads each load the magnetic separation sleeve and the tip head using an interference fit.

Further, the tip head has a pipetting volume of 5 μl-1,000 μl.

Further, to improve the drive efficiency of the first drive device and the second drive device and speed up the response speed, the first drive screw and the second drive screw are provided with T-shaped external threads.

The present disclosure has the following beneficial effects.

1. By introducing the magnetic rods and the disposable magnetic separation sleeves, passive magnetic separation is changed into active magnetic separation, which greatly improves the separation speed and greatly simplifies the magnetic separation process. Since the magnetic field is closer to the magnetic particles and the magnetic adsorption is performed by reciprocating, the active magnetic separation design has higher separation efficiency and shorter separation time, which is far superior to passive magnetic separation. The multi-channel parallel separation further improves the magnetic particle separation and transfer efficiency. The first drive device and the second drive device realize the reciprocation of the magnetic separation sleeves to complete the mixing of the reaction solution and the re-suspension of the cleaning solution. Therefore, the present disclosure has a simple structure, high reliability, and avoids a liquid splash. The present disclosure realizes a multi-channel parallel pipetting function, which enables precise pipetting of the sample or reagent, thus eliminating the need for a complex pipetting structure. In addition, the present disclosure integrates the functions of pipetting, magnetic adsorption, transfer, mixing, and unloading, which greatly improves the degree of automation.

2. The second drive device drives the piston rods to linearly reciprocate in the vertical direction, and the piston rods drive the magnetic rods to linearly reciprocate inside the loading heads and the injector chamber. The design realizes the automatic separation and loading of the magnetic separation sleeves and the tip heads on the loading heads, which does not require an additional mechanism and has strong practicability. The present disclosure has the advantages of high performance, small volume, and automated pipetting, can be applied to point-of-care testing (POCT) products, and has great potential for expansion.
3. The loading heads and the tip heads are in an interference fit to realize the multi-channel parallel pipetting function. The tip head has a pipetting volume of 5 μl-1,000 μl with high pipetting precision and high consistency. Therefore, the present disclosure has high parallel pipetting efficiency and greatly shortens the sample pretreatment time.
4. The multiple piston rods are connected to the injector chamber in a movable and sealing manner through a sealing ring or a sealing washer. The channels of the injector chamber in which the piston rods are connected form a negative pressure. This design facilitates the automatic adsorption of the reagent by the tip heads by controlling the expansion and contraction of the piston rods, avoids the need for other adsorption devices and a liquid passage, and achieves a simple structure.
5. When it is necessary to mix the reaction solution and re-suspend the cleaning solution, the first drive device and the second drive device drive the loading heads with the tip heads and the magnetic separation sleeves to move upward and downward. The design achieves a simple structure, high mixing efficiency, and avoids liquid splashing that may be caused by eccentric mixing.

Figure 1:
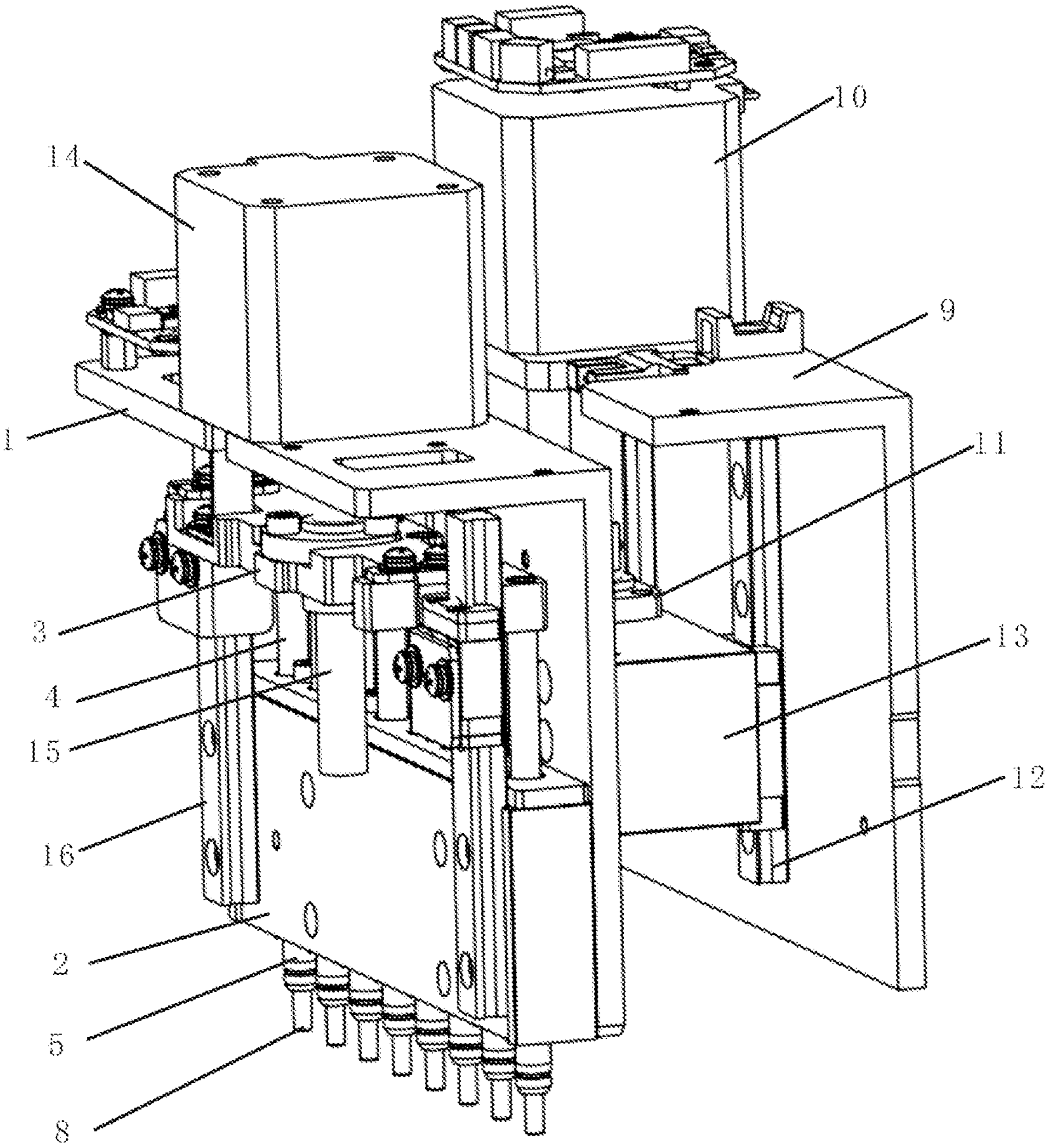
FIG. 1 is a three-dimensional structural view of a multi-channel parallel pretreatment device according to the present disclosure.

Reference Numerals: 1. second mounting bracket; 2. injector chamber; 3. mounting plate; 4. piston rod; 5. loading head; 6. tip head; 7. magnetic separation sleeve; 8. magnetic rod; 9. first mounting bracket; 10. first motor; 11. first drive screw; 12. first linear guide rail; 13. slider; 14. second motor; 15. second drive screw; and 16. second linear guide rail.

DETAILED DESCRIPTION OF THE EMBODIMENTS

The specific implementations of the present disclosure are described below to facilitate those skilled in the art to understand the present disclosure, but it should be clear that the present disclosure is not limited to the scope of the specific implementations. Various obvious changes made by those of ordinary skill in the art within the spirit and scope of the present disclosure defined by the appended claims should fall within the protection scope of the present disclosure.

Figure 2:
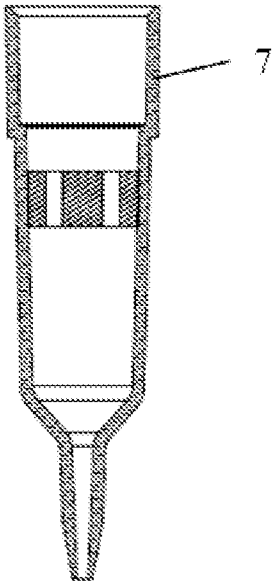
FIG. 2 is an enlarged view of a tip head according to the present disclosure.
Figure 3:
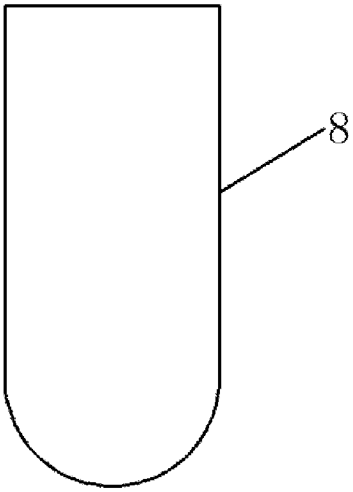
FIG. 3 is an enlarged view of a magnetic separation sleeve according to the present disclosure.

As shown in FIGS. 1 and 2, the present disclosure provides a multi-channel parallel pretreatment device, which includes a magnetic separation and transfer device configured to perform separation and transfer and a first drive device configured to drive the magnetic separation and transfer device to move.

As a specific implementation of the magnetic separation and transfer device, the magnetic separation and transfer device includes second mounting bracket 1. The second mounting bracket 1 is provided therein with injector chamber 2. Mounting plate 3 is provided above the top of the injector chamber 2. The mounting plate 3 is provided with piston rods 4. The piston rods 4 are connected to the injector chamber 2 in a movable and sealing manner. Preferably, but not limited to this, multiple piston rods 4 are connected to the injector chamber 2 in a movable and sealing manner through a sealing ring or a sealing washer.

The second mounting bracket 1 is further provided thereon with a second drive device, which is configured to drive the mounting plate 3 to linearly reciprocate in a vertical direction.

As a specific implementation of the first drive device, the first drive device includes first mounting bracket 9. The first mounting bracket 9 is provided thereon with first motor 10. An output end of the first motor 10 is provided with first drive screw 11. The first mounting bracket 9 is further vertically provided with first linear guide rail 12. The first linear guide rail 12 is connected to slider 13 in a slidable manner. The second mounting bracket 1 is fixedly connected to a slider 13, and the slider 13 is connected to the first drive screw 11 in a threaded manner.

As a specific implementation of the second drive device, the second drive device includes second motor 14 provided on the second mounting bracket 1. An output end of the second motor 14 is provided with second drive screw 15. The second drive screw 15 is connected to the mounting plate 3 in a threaded manner. The injector chamber 2 is provided with a second linear guide rail 16 that is vertical and connected to the mounting plate 3 in a slidable manner.

The injector chamber 2 is provided with loading heads 5 that are configured to load tip heads 6 or magnetic separation sleeves 7. The tip head 6 has a pipetting volume of 5 μl-1,000 μl with high pipetting precision and high consistency.

The loading heads 5 have a hollow structure. The piston rods 4 have free ends that are fixedly connected to magnetic rods 8 that are configured to adsorb magnetic beads in a magnetic particle reagent. The second drive device can drive the magnetic rods 8 on the piston rods 4 to pass through the loading heads 5.

To improve the drive efficiency of the first drive device and the second drive device and speed up the response speed, the first drive screw 11 and the second drive screw 15 are provided with T-shaped external threads.

A magnetic separation process of the multi-channel parallel pretreatment device is as follows. The first motor 10 drives the first drive screw 11 to rotate, and the rotated first drive screw 11 drives the slider 13 to move the second mounting bracket 1 downward. The loading heads 5 of the injector chamber 2 are provided with the magnetic separation sleeves 7. The loading heads 5 and the magnetic separation sleeves 7 are in an interference fit, and the magnetic separation sleeves 7 are loaded by frictional force. When the second mounting bracket 1 is descended to a fixed height, the loading of the magnetic separation sleeves 7 on the loading heads 5 is complete. After the loading of the magnetic separation sleeves 7 is complete, the first motor 10 is controlled to reverse, such that the second mounting bracket 1 is ascended to the highest position. The second motor 14 is rotated to move the mounting plate 3 downward through the second drive screw 15. The downward-moving mounting plate 3 drives the piston rods 4 and the magnetic rods 8 to move downward. When the magnetic rods 8 just reach the bottoms of the magnetic separation sleeves 7, the second motor 14 is stopped. The first motor 10 is controlled to rotate and drive the second mounting bracket 1 to move downward. When the magnetic separation sleeves 7 makes contact with a magnetic particle liquid, the magnetic separation sleeves are descended slowly to reach the bottom of the magnetic particle liquid. In this way, the magnetic particles are gradually captured at the ends of the magnetic separation sleeves 7. Multiple slow ascents or descents may be performed to fully complete the adsorption and separation of the magnetic particles. After the adsorption and separation are completed, the first motor 10 is controlled to drive the second mounting bracket 1 to ascend to the topmost end. All the magnetic particles are adsorbed on the ends of the outer walls of the magnetic separation sleeves 7. The separated liquid is pumped away, and a new cleaning solution is added or a supporting reagent strip is moved, such that the magnetic separation sleeves 7 are above the new cleaning solution. At this time, the magnetic particles need to be suspended in the cleaning solution again for cleaning. The first motor 10 is rotated to cause the second mounting bracket 1 to move down again until the magnetic separation sleeves 7 enter the cleaning solution. The second motor 14 is rotated to drive the piston rods 4, such that the magnetic rods 8 are driven to move up until the magnetic rods 8 are completely separated from the interior of the loading heads 5. The magnetic field disappears, and the magnetic particles are slowly detached from the ends of the magnetic separation sleeves 7. To speed up this process, the first motor can drive the second mounting bracket 1 to reciprocate up and down through different frequencies to ensure that the magnetic particles are fully mixed with the cleaning solution and suspended. After this process is complete, the first motor 10 drives the second mounting bracket 1 to ascend to the highest position again. So far, one cycle of magnetic separation, cleaning, and mixing is complete. If this process is required for more than one time, the above operations are repeated.

The multi-channel parallel pretreatment device can also be used to transfer the magnetic particles into a reagent for mixing, separate the magnetic particles in the reaction solution into the cleaning solution, or transfer the magnetic particles into a substrate solution for reaction and complete luminescence testing. After all separation actions are completed, the magnetic separation sleeves 7 are unloaded. The second motor 14 drives the piston rods 4 and the magnetic rods 8 to move downward. When the magnetic rods 8 reach the bottoms of the magnetic separation sleeves 7, the magnetic rods 8 continue to move downward until all the magnetic separation sleeves 7 are pushed out by the magnetic rods 8 and are separated from the loading heads 5.

A reagent transfer process of the multi-channel parallel pretreatment device is as follows. The first motor 10 is rotated to drive the second mounting bracket 1 to move downward through the slider 13. The second mounting bracket 1 is provided with the loading heads 5 fitted with the tip heads 6. The loading heads 5 and the fitted tip heads 6 are in an interference fit, and the tip heads 6 are loaded by frictional force. When the second mounting bracket 1 is descended to a fixed height, the loading of the fitted tip heads 6 is complete. After the loading is complete, the second mounting bracket 1 is ascended to the highest position. The first motor 10 drives the second mounting bracket 1 to descend to a fixed height. The front ends of the tip heads 6 of the injector chamber 2 with the tip heads 6 are located below the liquid level of the sample or reagent. The second motor 14 is rotated to drive the piston rods 4 to move upward through the mounting plate. Since the injector chamber 2 is a closed chamber, the sample or reagent is sucked into the tip heads 6 by the tip heads 6 under the action of negative pressure. The first motor 10 drives the second mounting bracket 1 to ascend until the tip heads 6 are removed from the liquid level of the sample or reagent. The fitted reagent strip is moved to the desired hole position, and the tip heads 6 are directly above the target hole position. The first motor 10 drives the second mounting bracket 1 to move downward, and the tip heads 6 are driven to run until below the liquid level. The second motor 14 drives the mounting plate 3 to move downward, and the mounting plate 3 drives the piston rods 4 to move downward. Under the action of pressure, the sample or reagent in the cavities of the tip heads 6 is injected into the target hole position. The first motor 10 drives the second mounting bracket 1 to cause the injector chamber 2 to ascend and to separate from the reagent, thereby realizing the automatic transfer of the sample or reagent. Then the piston rods 4 are moved downward, and the magnetic rods 8 are moved downward accordingly. After being moved downward for a fixed distance, the magnetic rods 8 contact filter plugs in the cavities of the fitted tip heads 6. The magnetic rods 8 are continuously moved downward, and the tip heads 6 are separated from the loading heads 5 to realize the unloading of the tip heads 6. If multiple pipetting is required, the tip heads 6 are loaded, and the suction and discharge actions are repeated. The pipetting volume can be 5 μl-1,000 μl. The multi-channel parallel pretreatment device can also be applied for reagent mixing. The tip heads 6 repeatedly sucks and discharges below the liquid level to fully mix the reagent or sample.

When it is necessary to mix the reaction solution and re-suspend the cleaning solution, the first drive device and the second drive device drive the loading heads 5 with the magnetic separation sleeves 7 to move upward and downward. The design achieves a simple structure, high mixing efficiency, and avoids liquid splashing that may be caused by eccentric mixing.

There are multiple piston rods 4. The multiple piston rods 4 are evenly spaced in the length direction of the mounting plate 3. One magnetic rod 8 is fixedly connected to the free end of each piston rod 4. There are multiple loading heads 5. The multiple loading heads 5 are evenly spaced in the length direction of the injector chamber 2. The magnetic rods 8 are fitted with the loading heads 5 one by one. By introducing the magnetic rods 8 and the disposable magnetic separation sleeves 7, passive magnetic separation is changed into active magnetic separation, which greatly improves the separation speed and greatly simplifies the magnetic separation process. Since the magnetic field is closer to the magnetic particles, and the magnetic adsorption is performed by reciprocating, the active magnetic separation design has higher separation efficiency and shorter separation time, which is far superior to passive magnetic separation. The multi-channel parallel separation further improves the magnetic particle separation and transfer efficiency. The first drive device and the second drive device realize the reciprocation of the magnetic separation sleeves 7 to complete the mixing of the reaction solution and the re-suspension of the cleaning solution. Therefore, the present disclosure has a simple structure, high reliability, and avoids a liquid splash. The present disclosure realizes a multi-channel parallel pipetting function, which enables precise pipetting of the sample or reagent, thus eliminating the need for a complex pipetting structure. In addition, the present disclosure integrates the functions of pipetting, magnetic adsorption, transfer, mixing, and unloading, which greatly improves the degree of automation.

The second drive device drives the piston rods 4 to linearly reciprocate in the vertical direction, and the piston rods 4 drive the magnetic rods 8 to linearly reciprocate inside the loading heads 5 and the injector chamber 2. The design realizes the automatic separation and loading of the magnetic separation sleeves 7 and the tip heads 6 on the loading heads 5, which does not require an additional mechanism and has strong practicability. The present disclosure has the advantages of high performance, small volume, and automated pipetting, can be applied to point-of-care testing (POCT) products, and has great potential for expansion.

What is claimed is:

1. A multi-channel parallel pretreatment device, comprising a magnetic separation and transfer device configured to perform separation and transfer and a first drive device configured to drive the magnetic separation and transfer device to move, wherein the magnetic separation and transfer device comprises a second mounting bracket; the second mounting bracket is provided therein with an injector chamber; a mounting plate is provided above a top of the injector chamber and is provided with piston rods; the piston rods are connected to the injector chamber in a movable and sealing manner; and the second mounting bracket is further provided thereon with a second drive device; the second drive device is configured to drive the mounting plate to linearly reciprocate in a vertical direction;

the injector chamber is provided with loading heads; each of the loading heads is configured to load a tip head or a magnetic separation sleeve and has a hollow structure; and free ends of the piston rods are fixedly connected to magnetic rods; the magnetic rods are configured to adsorb magnetic beads in a magnetic particle reagent; and the second drive device is configured to drive the magnetic rods on the piston rods to pass through the loading heads.

2. The multi-channel parallel pretreatment device according to claim 1, wherein the first drive device comprises a first mounting bracket; the first mounting bracket is provided thereon with a first motor; and an output end of the first motor is provided with a first drive screw;

the first mounting bracket is further vertically provided with a first linear guide rail; the first linear guide rail is connected to a slider in a slidable manner; and the slider is fixedly connected to the second mounting bracket; and the first drive screw is connected to the slider in a threaded manner.

3. The multi-channel parallel pretreatment device according to claim 2, wherein the second drive device comprises a second motor provided on the second mounting bracket; and an output end of the second motor is provided with a second drive screw; the second drive screw is connected to the mounting plate in a threaded manner; and the injector chamber is vertically and fixedly provided with a second linear guide rail; the second linear guide rail is connected to the mounting plate in a slidable manner.

4. The multi-channel parallel pretreatment device according to claim 1, wherein the piston rods are provided and are evenly spaced in a length direction of the mounting plate; and the free end of each of the piston rods is fixedly connected to one magnetic rod; and the loading heads are provided and are evenly spaced in a length direction of the injector chamber; and the loading heads are fitted with the magnetic rods one by one.

5. The multi-channel parallel pretreatment device according to claim 4, wherein the piston rods are connected to the injector chamber in a movable and sealing manner through a sealing ring or a sealing washer.

6. The multi-channel parallel pretreatment device according to claim 4, wherein each of the loading heads loads the magnetic separation sleeve and the tip head using an interference fit.

7. The multi-channel parallel pretreatment device according to claim 6, wherein the tip head has a pipetting volume of 5 μl-1,000 μl.

8. The multi-channel parallel pretreatment device according to claim 3, wherein the first drive screw and the second drive screw are provided with T-shaped external threads.

* * * * *